(12) United States Patent
Darmon et al.

(10) Patent No.: US 10,396,043 B2
(45) Date of Patent: Aug. 27, 2019

(54) TIMING BASED CAMOUFLAGE CIRCUIT

(71) Applicant: Cisco Technology, Inc., San Jose, CA (US)

(72) Inventors: David Darmon, Jerusalem (IL); Avi Klein, Elazar (IL); Yehuda Salmon, Jerusalem (IL); Aharon Grabovsky, Nerya (IL); Ruben Attia, Modiin (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/285,598

(22) Filed: Feb. 26, 2019

(65) Prior Publication Data

US 2019/0189571 A1    Jun. 20, 2019

Related U.S. Application Data

(63) Continuation of application No. 15/640,615, filed on Jul. 3, 2017, now Pat. No. 10,262,956.

(60) Provisional application No. 62/463,742, filed on Feb. 27, 2017.

(51) Int. Cl.
    *H01L 23/00*     (2006.01)
    *G06F 17/50*     (2006.01)

(52) U.S. Cl.
    CPC .......... *H01L 23/576* (2013.01); *G06F 17/505* (2013.01); *G06F 17/5036* (2013.01); *G06F 17/5068* (2013.01); *G06F 2217/84* (2013.01)

(58) Field of Classification Search
    None
    See application file for complete search history.

(56) References Cited

U.S. PATENT DOCUMENTS

| | | |
|---|---|---|
| 5,783,846 A | 7/1998 | Baukus et al. |
| 6,774,413 B2 | 8/2004 | Baukus et al. |
| 6,815,816 B1 | 11/2004 | Clark, Jr. et al. |
| 6,924,552 B2 | 8/2005 | Baukus et al. |
| 7,049,667 B2 | 5/2006 | Chow et al. |
| 8,111,089 B2 | 2/2012 | Cocchi et al. |
| 8,151,235 B2 | 4/2012 | Chow et al. |
| 8,679,908 B1 | 3/2014 | Chow et al. |
| 8,980,734 B2 | 3/2015 | Stephens et al. |
| 9,287,879 B2 | 3/2016 | Thacker, III |

(Continued)

FOREIGN PATENT DOCUMENTS

| | | |
|---|---|---|
| JP | 2016063061 A | 4/2016 |
| WO | 2010011399 A2 | 1/2010 |

OTHER PUBLICATIONS

Cocchi, Ronald P. et al., "Circuit Camouflage Integration for Hardware IP Protection", in Proceedings of the 51st Annual Design Automation Conference; Jun. 1-5, 2014, pp. 1-5.

(Continued)

*Primary Examiner* — Cassandra F Cox
(74) *Attorney, Agent, or Firm* — Edell, Shapiro & Finnan, LLC

(57) ABSTRACT

In one embodiment, a chip comprising a circuit, the circuit comprising a plurality of components, wherein the circuit is adapted to perform a function that is dependent on timing behavior of the circuit, and wherein a geometry of a layout of the circuit is substantially the same as another geometry of another layout of another circuit adapted to perform another function that is dependent on different timing behavior.

20 Claims, 5 Drawing Sheets

(56) References Cited

U.S. PATENT DOCUMENTS

| | | | |
|---|---|---|---|
| 9,479,176 B1 | 10/2016 | Eble et al. | |
| 9,576,091 B1 | 2/2017 | Evans et al. | |
| 2003/0101399 A1* | 5/2003 | Yoshikawa | G06F 17/505 714/744 |
| 2011/0055649 A1 | 3/2011 | Koushanfar et al. | |
| 2012/0139582 A1 | 6/2012 | Cocchi et al. | |
| 2013/0191803 A1 | 7/2013 | Chow et al. | |
| 2013/0205271 A1* | 8/2013 | Kanno | G06F 17/5045 716/103 |
| 2015/0071434 A1 | 3/2015 | Thacker, III et al. | |
| 2018/0247902 A1 | 8/2018 | Darmon et al. | |

OTHER PUBLICATIONS

Erbagci, B. et al., "A secure camouflaged threshold voltage defined logic family.", 2016 IEEE International Symposium on Hardware Oriented Security and Trust (HOST), McLean, VA, 2016, pp. 229-235.

Ghandali, Samaneh et al., "A Design Methodology for Stealthy Parametric Trojans and Its Application to Bug Attacks.", in International Conference on Cryptographic Hardware and Embedded Systems, pp. 825-847. Springer Berlin Heidelberg, 2016.

Rajendran, J. et al., "VLSI testing based security metric for IC camouflaging.", 2013 IEEE International Test Conference (ITC), Anaheim, CA, 2013, pp. 1-4.

Zhang, J. "A Practical Logic Obfuscation Technique for Hardware Security.", in IEEE Transactions on Very Large Scale Integration (VLSI) Systems, vol. 24, No. 3, pp. 1193-1197, Mar. 2016.

* cited by examiner

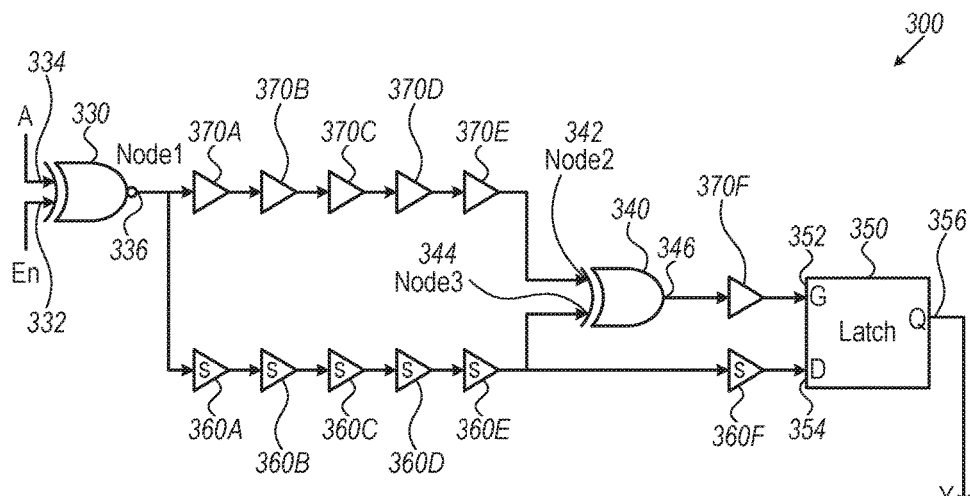
FIG. 3
FIG. 4
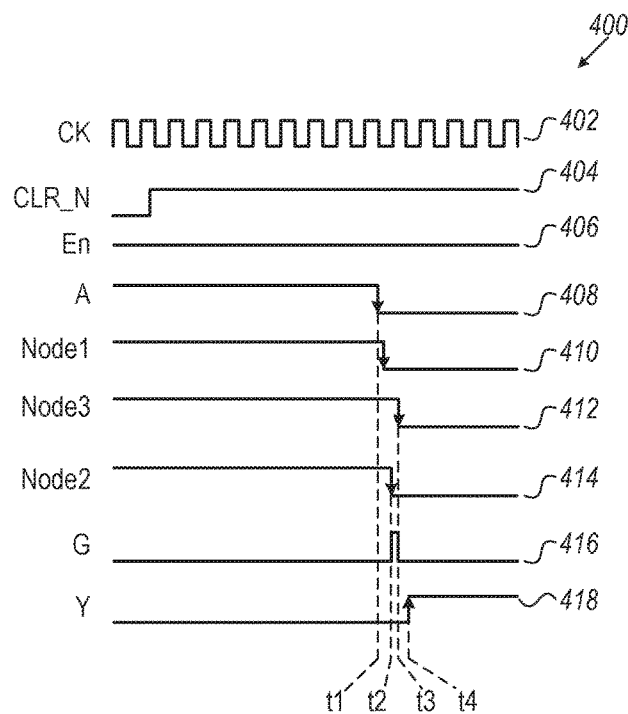

- Cell boundary
- Polysilicon layer
- Metal layer
- Contact layer
- HVT diffusion layer

- Cell boundary
- Polysilicon layer
- Metal layer
- Contact layer
- RVT diffusion layer

TIMING BASED CAMOUFLAGE CIRCUIT

CROSS-REFERENCE TO RELATED APPLICATIONS

This application is a continuation of U.S. application Ser. No. 15/640,615, filed Jul. 3, 2017, which in turn claims priority to U.S. Provisional Application No. 62/463,742 filed on Feb. 27, 2017, and both of which are hereby incorporated by reference herein.

TECHNICAL FIELD

The present disclosure generally relates to circuit camouflage in order to hamper reverse engineering.

BACKGROUND

A reverse engineering attack on a chip includes the following main stages:

First, the chip is prepared by removing one or more layers of the chip, in order to expose the layout(s) of the circuit(s) in the chip. The circuit(s) may include components that are laid out in the active layer(s) of the chip and connections between the components that are laid out in the interconnect layer(s) of the chip.

For example, one or more protection layers of the chip may be removed. Protection layer(s) provide protection against scratching, moisture, and/or contamination, etc. Typically although not necessarily, the protection layer(s) are above the active layer(s), e.g. directly above the interconnect layer(s) of the chip. The protection layer(s), e.g. passivation layer(s), are composed of material(s) such as silicon, silicon nitride, silicon dioxide, aluminum oxide, etc., which provide protection against scratching, moisture, contamination, etc.

Second, schematic(s) and/or netlist(s) are prepared based on the geometry/ies of layout(s) of the circuit(s) in the chip. Third, the schematic(s) and/or netlist(s) are used to determine the function of each of the circuits.

BRIEF DESCRIPTION OF THE DRAWINGS

The present disclosure will be understood and appreciated more fully from the following detailed description, taken in conjunction with the drawings in which:

FIG. 3 is a diagram of another circuit, in accordance with some embodiments of the presently disclosed subject matter;

FIG. 4 is a timing diagram for the circuit of FIG. 3, in accordance with some embodiments of the presently disclosed subject matter;

DESCRIPTION OF EXAMPLE EMBODIMENTS

Overview

There is provided in accordance with some embodiments of the presently disclosed subject matter, a chip comprising a circuit, the circuit comprising a plurality of components, wherein the circuit is adapted to perform a function that is dependent on timing behavior of the circuit, and wherein a geometry of a layout of the circuit is substantially the same as another geometry of another layout of another circuit adapted to perform another function that is dependent on different timing behavior.

Example Embodiments

In accordance with the present disclosure, a function of a circuit is dependent on timing behavior of the circuit and therefore the function of the circuit may be camouflaged. For example, for a function of a circuit that is predictably dependent on the timing behavior of the circuit, each time the circuit is manufactured, e.g. in a chip, the circuit may behave predictably in accordance with the function of the circuit. However, the function of the circuit may be camouflaged if the timing behavior is not readily apparent, for instance, during reverse engineering.

A function that is dependent on the timing behavior of the circuit, may be dependent on any appropriate timing feature(s) included in the timing behavior. For example, such timing feature(s) may include one or more of the following: transition time/edge time, propagation delay (e.g. delay between input to and output from a component, delay between exiting one component and entering another component, etc.), timing difference(s) between paths, clock rate, timing violation (e.g. due to clock tree, due to path(s) of non-clock signal(s), etc.), no timing violation, etc.

Two aspects of the present disclosure are discussed below, for the sake of further illustration to the reader. However, the disclosure contemplates other aspects where the function of the circuit may be camouflaged due to the function of the circuit being dependent on timing behavior.

In accordance with a first aspect of the present disclosure, a function of a circuit that depends on timing behavior of the circuit may not be readily apparent from analyzing a schematic and/or a netlist prepared during reverse engineering based on the geometry of the layout of the circuit.

Figure 1:
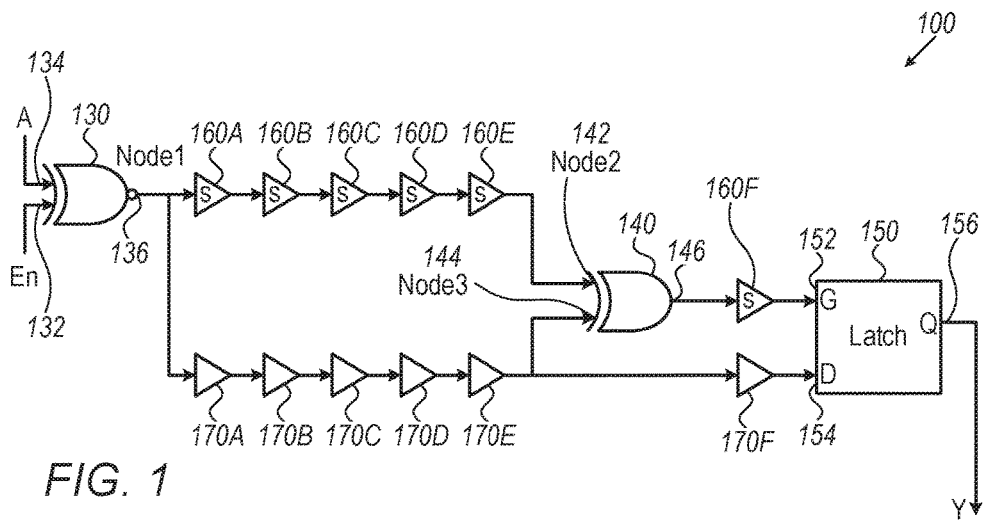
FIG. 1 is a diagram of a circuit, in accordance with some embodiments of the presently disclosed subject matter.

Reference is now made to FIG. 1 which is a diagram of a circuit 100, in accordance with some embodiments of the presently disclosed subject matter.

Circuit 100 functions as a buffer. In circuit 100, a transition in logic level of input "A" signal, from low to high or from high to low, causes after a certain delay a corresponding transition in logic level for output "Y" signal. Circuit 100 is asynchronous.

Circuit 100 includes an XNOR gate 130, an XOR gate 140, and a latch 150 that is a gated D latch. Latch 150 is characterized by input terminals G 152 and D 154 and by an output terminal Q 156. When the signal at input terminal G 152 to latch 150 is high, the signal at input terminal D 154 passes through latch 150 and therefore the logic level of the signal at input terminal D 154 is reproduced as the logic level of the Y signal at output terminal Q 156. Otherwise when the signal at input terminal G 152 to latch 150 is low, the signal at input terminal D 154 does not pass through latch 150 and therefore the Y signal at output terminal Q 156 remains at the previous value thereof. Circuit 100 further includes buffer cells 160 and 170 which have substantially the same geometries, but differing timing behaviors. (The term "substantially the same" will be discussed further below.) For example, the timing behavior of a buffer cell may be dependent on the threshold voltage level of transistor(s) comprised in the buffer cell. The threshold voltage level of transistor(s) in the buffer cell may be dependent on the doping level (also referred to as dopant concentration) of the diffusion layer of the buffer cell. In circuit 100 buffer cells 160 (namely 160A, 160B, 160C, 160D, 160E, 160F) are high voltage threshold (HVT) buffer cells, whereas buffer cells 170 (namely 170A, 170B, 170C, 170D, 170E, and 170F) are regular voltage threshold (RVT) buffer cells, also referred to as standard voltage threshold (SVT) buffer cells. In an HVT buffer cell there is a larger delay between input into the cell and output from the cell, than for an RVT buffer cell. In other embodiments, buffer cells 160 may be RVT buffer cells and buffer cells 170 may be low voltage threshold (LVT) buffer cells; buffer cells 170 may be HVT buffer cells and buffer cells 160 may be LVT buffer cells; etc. In an LVT buffer cell there is a smaller delay between input into the cell and the output from the cell, than for an RVT buffer cell.

Figure 2:
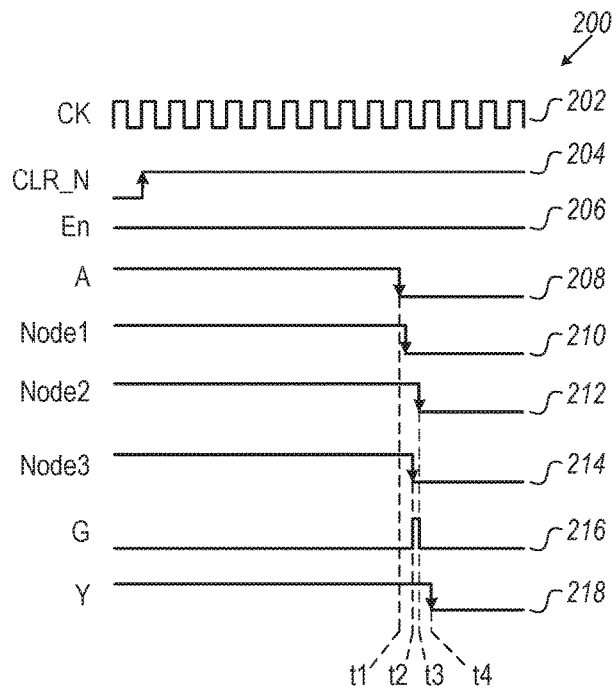
FIG. 2 is a timing diagram for the circuit of FIG. 1, in accordance with some embodiments of the presently disclosed subject matter.

FIG. 2 is a timing diagram 200 for circuit 100 of FIG. 1, in accordance with some embodiments of the presently disclosed subject matter. The description of FIG. 2 will also refer to FIG. 1.

Timing diagram 200 illustrates the timing of a clock ("CK") signal 202, a CLR_N signal 204, an enable ("En") signal 206 at an input terminal 132 to XNOR gate 130 of FIG. 1, an A signal 208 at an input terminal 134 to XNOR gate 130 of FIG. 1, a node 1 signal 210 at a node 1 output terminal 136 from XNOR gate 130, a node 2 signal 212 at a node 2 input terminal 142 to XOR gate 140 of FIG. 1, a node 3 signal 214 at a node 3 input terminal 144 to XOR gate 140, a G signal 216 at input terminal G 152 to latch 150 of FIG. 1, and a Y signal 218 at output terminal Q 156 from latch 150.

Clock signal 202 may be the clock of a chip that includes circuit 100. CLR_N signal 204, when transitioning from low to high, may allow the chip to begin functioning, and when high may allow the chip to continue functioning. Neither clock signal 202 nor CLR_N signal 204 are directly related to circuit 100.

Node 1 signal 210 at output terminal 136 of XNOR gate 130 is set to low only when signals enable 206 and A 208 at input terminals 132 and 134 are at different logic levels. In FIG. 2 enable signal 206 is high, and therefore node 1 signal 210 transitions from high to low after A signal 208 transitions from high to low (at time t1). Due to XNOR gate 130, there is a delay between time t1 and the time that node 1 signal 210 transitions to a low value.

The transition of the logic level of node 1 signal 210 at output terminal 136 from high to low propagates in one path via five HVT buffer cells 160A, 160B, 160C, 160D, and 160E and in another path via five RVT buffer cells 170A, 170B, 170C, 170D, and 170E. Node 3 signal 214, exiting from RVT buffer cell 170E and entering XOR gate 140 at node 3 input terminal 144, transitions to low, before node 2 signal 212, exiting HVT buffer cell 160E and entering XOR gate 140 at node 2 input terminal 142, transitions to low.

Node 3 signal 214 is shown in FIG. 2 as transitioning to low at time t2, and node 2 signal 212 is shown as transitioning to low at time t3. The differing timing behaviors between RVT buffer cells 170 and HVT buffer cells 160 result in the time difference between when node 3 signal 214 transitions to low (e.g. time t2) and when node 2 signal 212 transitions to low (e.g. time t3). The signal at output terminal 146 of XOR gate 140 is high only when node 2 signal 212 and node 3 signal 214 are at different logic levels, which occurs during the time period between time t2 and time t3 when node 3 signal 214 is low but node 2 signal 212 is high. Therefore signal G 216 at input terminal G 152 to latch 150 is high approximately during the time period between time t2 and time t3. HVT buffer cell 160F adds a delay between the time period of t2 minus t3 and the time period that signal G 216 is high. RVT buffer cell 170F introduces a delay (which is less than the delay introduced by HVT buffer cell 160F), so that the signal at input D 154 is delayed compared to node 3 signal 214. During the time period that signal G 216 is high, the signal at input D 154 to latch 150 passes through latch 150, and is reproduced at output terminal Q 156 at time t4, where the delay between the signal inputted at input terminal D 154 and the reproduction at output terminal Q 156 is introduced by latch 150. As shown in FIG. 2, and as discussed above, during the time period between time t2 and time t3, node 3 signal 214 is already low and consequently it may be assumed that during the time period that G signal 216 is high, the signal at D terminal 154 is already low. At time t4, Y signal 218 at output terminal Q 156 of latch 150 therefore transitions to low in agreement with the transition to low of A signal 208 at time t1.

Reference is now made to FIG. 3 which is a diagram of another circuit 300, in accordance with some embodiments of the presently disclosed subject matter.

Circuit 300 functions as an inverter. In circuit 300, a transition in logic level of input "A" signal, from low to high or high to low, causes after a certain delay an opposite transition in logic level for output "Y" signal from high to low or low to high respectively. Circuit 300 is asynchronous.

Circuit 300 includes an XNOR gate 330, an XOR gate 340, and a latch 350 which is a gated D latch. Latch 350 is characterized by input terminals G 352 and D 354 and by an output terminal Q 356. When the signal at input terminal G 352 to latch 350 is high, the signal at input terminal D 354 passes through latch 350 and therefore the logic level of the signal at input terminal D 354 is reproduced as the logic level of the Y signal at output terminal Q 356. Otherwise when the signal at input terminal G 352 to latch 350 is low, the signal at input terminal D 354 does not pass through latch 350 and therefore the Y signal at output terminal Q 356 remains at the previous value thereof. Circuit 300 further includes buffer cells 360 and 370 which have substantially the same geometries, but differing timing behaviors. For example, the timing behavior of a buffer cell may be dependent on the threshold voltage level of transistor(s) comprised in the cell. In circuit 300 buffer cells 360 (namely 360A, 360B, 360C, 360D, 360E, 360F) are high voltage threshold (HVT) buffer cells, whereas buffer cells 370 (namely 370A, 370B, 370C, 370D, 370E, and 370F) are regular voltage threshold (RVT) buffer cells, also referred to as standard voltage threshold (SVT) buffer cells. In other embodiments, buffer cells 360 may be RVT buffer cells and buffer cells 370 may be low voltage threshold (LVT) buffer cells; buffer cells 370 may be HVT buffer cells and buffer cells 360 may be LVT buffer cells; etc.

FIG. 4 is a timing diagram 400 for circuit 300 of FIG. 3, in accordance with some embodiments of the presently disclosed subject matter. The description of FIG. 4 will also refer to FIG. 3.

Timing diagram 400 illustrates the timing of a clock ("CK") signal 402, a CLR_N signal 404, an enable ("En") signal 406 at an input terminal 332 to XNOR gate 330 of FIG. 1, an A signal 408 at an input terminal 334 to XNOR gate 330 of FIG. 3, a node 1 signal 410 at a node 1 output terminal 336 from XNOR gate 330, a node 3 signal 412 at a node 3 input terminal 344 to XOR gate 340 of FIG. 3, a node 2 signal 414 at a node 2 input terminal 342 to XOR gate 340, a G signal 416 at input terminal G 352 to latch 350 of FIG. 3, and a Y signal 418 at output terminal Q 356 from latch 350.

Clock signal 402 may be the clock of a chip that includes circuit 100. CLR_N signal 404, when transitioning from low to high, may allow the chip to begin functioning, and when high may allow the chip to continue functioning. Neither clock signal 402 nor CLR_N signal 404 are directly related to circuit 300.

Node 1 signal 410 at output terminal 336 of XNOR gate 330 is set to low only when signals enable 406 and A 408 at input terminals 332 and 334 are at different logic levels. In FIG. 4 enable signal 406 is high, and therefore node 1 signal 410 transitions from high to low after A signal 408 transitions from high to low (at time t1). Due to XNOR gate 330 there is a delay between time t1 and the time that node 1 signal 410 transitions to a low value.

The transition of the logic level of node 1 signal 410 at output terminal 336 from high to low propagates in one path via five HVT buffer cells 360A, 360B, 360C, 360D, and 360E and in another path via five RVT buffer cells 370A, 370B, 370C, 370D, and 370E. Node 3 signal 412, exiting from HVT buffer cell 360E and entering XOR gate 340 at node 3 input terminal 344, transitions to low, after node 2 signal 414, exiting RVT buffer cell 370E and entering XOR gate 340 at node 2 input terminal 342, transitions to low. Node 2 signal 414 is shown in FIG. 4 as transitioning to low at time t2, and node 3 signal 412 is shown as transitioning to low at time t3. The differing timing behaviors between RVT buffer cells 370 and HVT buffer cells 360 result in the time difference between when node 2 signal 414 transitions to low (e.g. time t2) and when node 3 signal 412 transitions to low (e.g. time t3). The signal at output terminal 346 of XOR gate 340 is high only when node 3 signal 412 and node 2 signal 414 are at different logic levels, which occurs during the time period between time t2 and time t3 when node 2 signal 414 is low but node 3 signal 412 is high. Therefore signal G 416 at input terminal G 352 to latch 350 is high approximately during the time period between time t2 and time t3. RVT buffer cell 370F adds a delay between the time period of t2 minus t3 and the time period that signal G 416 is high. HVT buffer cell 360F introduces a delay (which is greater than the delay introduced by RVT buffer cell 370F), so that the signal at input D 354 to latch 350 is delayed compared to node 3 signal 412. During the time period that signal G 416 is high, the signal at input D 354 to latch 350 passes through latch 350, and is reproduced at output terminal Q 356 at time t4, where the delay between the signal inputted at input terminal D 354 and reproduction at output terminal 356 is introduced by latch 350. As shown in FIG. 4, and as discussed above, during the time period between time t2 and time t3, node 3 signal 412 is still high, and consequently it may be assumed that during the time period that G signal 416 is high, the signal at input terminal D 354 is still high. At time t4, Y signal 418 at output terminal 356 of latch 350 therefore transitions from low to high, in contrast to the transition from high to low of A signal 408 at time t1.

Figure 5:
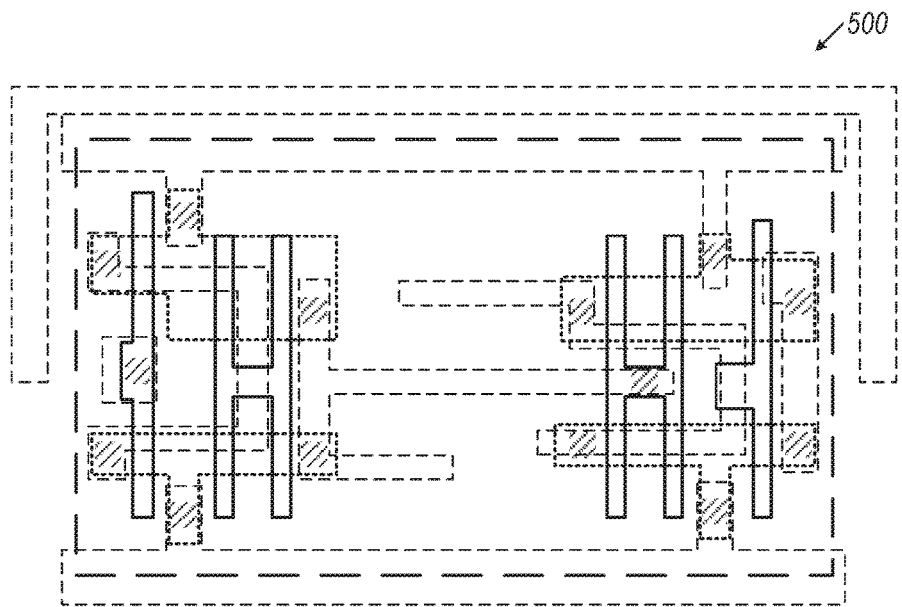
FIG. 5 is a sketch of an actual image of a high voltage threshold buffer cell, in accordance with some embodiments of the presently disclosed subject matter.
Figure 6:
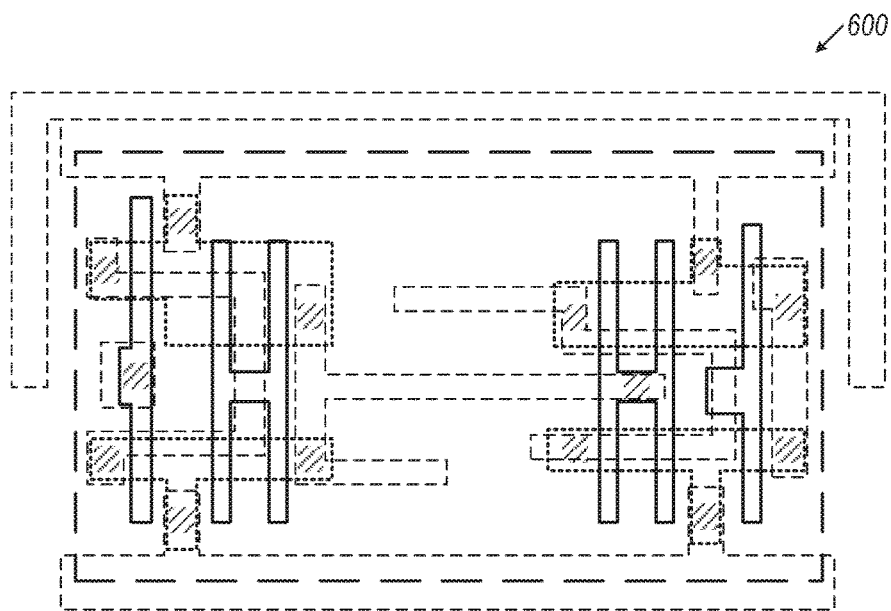
FIG. 6 is a sketch of an actual image of a regular voltage threshold buffer cell, in accordance with some embodiments of the presently disclosed subject matter.

FIG. 5 is a sketch 500 of an actual image of HVT buffer cell 160 or 360, in accordance with some embodiments of the presently disclosed subject matter. FIG. 6 is a sketch 600 of an actual image of RVT buffer cell 170 or 370, in accordance with some embodiments of the presently disclosed subject matter.

In FIGS. 5 and 6, the polygons outlined by solid line are in the polysilicon layer of the buffer cell. The polygons outlined by dashed lines are in the metal layer of the buffer cell. Diagonal lines are in the contact layer. The polygons outlined by dotted lines are in the diffusion layer. In FIG. 5 such polygons are in the HVT diffusion layer and in FIG. 6, such polygons are in the RVT diffusion layer. The bolded dashed line in each of FIGS. 5 and 6 shows the buffer cell boundary. For example, the metal layer may be part of the interconnect layer(s) mentioned above. The contact layer, polysilicon layer and diffusion layer may be part of the active layer(s) mentioned above.

As may be seen from FIGS. 5 and 6, the geometries of HVT buffer cells 160 or 360 and RVT buffer cells 170 or 370 are substantially the same. Buffer cells 160 versus cells 370 and/or buffer cells 170 versus buffer cells 360 may have substantially the same geometries, for example, if buffer cells 160 and 370 (and/or buffer cells 170 and 360) have substantially the same dimensions and any elements in buffer cells 160 and 370 (and/or in buffer cells 170 and 360) have substantially the same dimensions. The materials of buffer cells 160 and 370 (and/or of buffer cells 170 and 360) may, however, differ due to different dopant concentrations.

The term "substantially the same" should be construed as being substantially the same within the resolution of the name of the fabrication process. For example, if buffer cells 160, 170, 360 and 370 are fabricated in a 28 nm process then the geometries of buffer cells 160, 170, 360 and 370 may have a tolerance of 28 nm (meaning the geometries may differ by ±28 nm and still be considered to be substantially the same).

Referring again to FIGS. 1 and 3, it is noted that other than the replacement of buffer cells 160 in FIG. 1 by buffer cells 370 in FIG. 3, and buffer cells 170 in FIG. 1 by buffer cells 360 in FIG. 3, the components and connections between components of circuit 300 are substantially the same as those in corresponding positions of circuit 100. It is further noted that as shown in FIGS. 5 and 6 buffer cells 160 in circuit 100 and buffer cells 370 in corresponding positions in circuit 300 have substantially the same geometries despite having different timing behaviors; and buffer cells 170 in circuit 100 and buffer cells 360 in corresponding positions in circuit 300 have substantially the same geometries despite having different timing behaviors. The difference in timing behaviors of buffer cells 160 versus buffer cells 370, and/or of buffer cells 170 versus buffer cells 360 causes circuits 100 and 300 to have different timing behaviors. For example, the different timing behaviors of buffer cells 160 versus buffer cells 370 and/or of buffer cells 170 versus buffer cells 360 may include different propagation delays between input to and output from the cell. The different timing behaviors of circuits 100 and 300 may include, for example, different timing feature(s) such as different propagation delays, different transition times and/or different timing differences between paths, as discussed above. Hence, circuits 100 and 300 may be laid out so that the resulting respective geometries of the layouts are substantially the same, even though the functions of circuits 100 and 300 are different due to the different timing behaviors of circuits 100 and 300. The geometries of the layouts may be substantially the same within the resolution (e.g. ±28 nm) of the name of the process (e.g. 28 nm process) used to fabricate the circuits. The geometry of the layout may thus camouflage the circuit function.

If reverse engineering takes place, a schematic and/or a netlist that is prepared during the reverse engineering based on a geometry of a layout of circuit 100 may be representative of circuit 100 or circuit 300; and/or a schematic and/or a netlist that is prepared during the reverse engineering based on a geometry of a layout of circuit 300 may be representative of circuit 100 or circuit 300. Therefore the actual function of the circuit that is being reverse engineered may not be readily apparent from the prepared schematic and/or netlist. The actual function may not be readily apparent because the actual function is dependent on the timing behavior of the circuit that is being reverse engineered. However, since the timing behavior of the circuit may not be readily apparent from the geometry of the layout, the timing behavior of the circuit may also not be readily apparent from the prepared schematic and/or netlist.

The number (i.e. quantity) of HVT buffer cells 160 or 360 and/or the number of RVT buffer cells 170 or 370 may vary depending on the embodiment, in order to achieve the buffer function in circuit 100 or the invertor function in circuit 300. Additionally or alternatively, the positioning of HVT buffer cells 160 or 360 and/or the positioning of RVT buffer cells 170 or 370 may vary depending on the embodiment, in order to achieve the buffer function in circuit 100 or the invertor function in circuit 300. It is noted that both circuit 100 and circuit 300 are functional, the functions of both circuit 100 and 300 are predictable when manufactured, and neither circuit 100 or 300 is designed to cause a chip that includes the circuit to fail.

Optionally, there may be a pool of buffer cells that are have substantially the same geometries but are characterized by varied timing behaviors. The pool of buffer cells may be from a standard cell library. For example, the pool may include HVT buffer cells, RVT buffer cells, LVT buffer cells, etc. One or more buffer cells characterized by a certain timing behavior may be selected from this pool when designing circuit 100 (or 300), where the certain timing behavior of the selected buffer cell(s) is suitable for implementing the timing behavior of circuit 100 (or 300) for the function of circuit 100 (or 300). Additionally or alternatively, one or more other buffer cells characterized by a different timing behavior may be selected from this pool when designing circuit 100 (or 300), where the different timing behavior of the other selected buffer cell(s) is suitable for implementing the timing behavior of circuit 100 (or 300) for the function of circuit 100 (or 300). Additionally or alternatively, the quantity and/or positioning of the one or more buffer cells and/or of the one or more other buffer cells may be suitable for implementing the timing behavior of circuit 100 (or 300) for the function of circuit 100 (or 300).

In some embodiments, a chip may include at least one particular circuit (e.g. circuit 100) characterized by a timing behavior and therefore a function, and/or at least one specific circuit (e.g. circuit 300) characterized by a different timing behavior and therefore a different function, despite having a geometry of a layout that is substantially the same as the geometry of the layout of the particular circuit. For example, the chip may be an application specific integrated circuit (ASIC). In embodiments where a chip includes at least one particular circuit (e.g. circuit 100) and at least one specific circuit (e.g. circuit 300), reverse engineering of the chip may be rendered more complicated due to the plurality of circuits with different functions that may not be readily apparent from schematics and/or netlists prepared during the reverse engineering based on the geometries of the layouts of the plurality of circuits.

In circuits 100 and 300, the components that have substantially the same geometries but dissimilar timing behaviors are buffer cells. However, in some embodiments, other components and/or connections that have substantially the same geometries but dissimilar timing behaviors may additionally or alternatively be used in corresponding positions in a plurality of circuits; causing the circuits to have dissimilar timing behaviors and thus differing functions. The geometries of the layouts of such circuits may be substantially the same, and therefore the functions may not be readily apparent from netlists and/or schematics prepared based on the geometries of the layouts. The functions of such circuits may vary depending on the embodiment.

In accordance with a second aspect of the subject matter, the function of a circuit is dependent on timing behavior of the circuit, the timing behavior including one or more timing violations. Timing violation(s) may occur, for example, due to a clock tree for one or more components of the circuit, and/or due to the path(s) of one or more non-clock signals inputted into one or more components of the circuit.

It should be understood that a clock tree and/or input(s) may often be designed to prevent timing violations (also referred to as races) in a circuit, so that the circuit may be adapted to perform a particular function. In accordance with some embodiments of the subject matter, the clock tree and/or path(s) of non-clock signal(s) may additionally or alternatively be designed to cause at least one timing violation in the circuit, so that the circuit may be adapted to perform a different function than would have been the case if there were no timing violation(s). Therefore the design of the clock tree and/or of the path(s) of non-clock signal(s) may camouflage the function of the circuit. If a circuit is reverse engineered, it may not be readily apparent whether the design of the clock tree and/or of the path(s) of non-clock signal(s) prevents any timing violation(s) and therefore the function of the circuit is the function expected when there are no timing violations; or whether the design of the clock tree and/or of the path(s) of non-clock signal(s) causes at least one timing violation and therefore whether the circuit has a different function.

Figure 7:
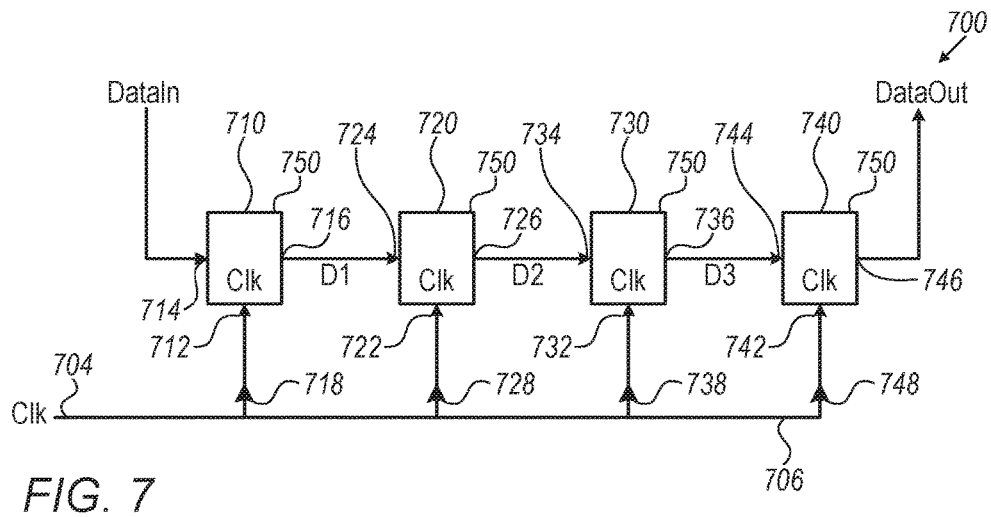
FIG. 7 is a diagram of another circuit, in accordance with some embodiments of the presently disclosed subject matter.

FIG. 7 is a diagram of another circuit 700, in accordance with some embodiments of the presently disclosed subject matter.

Circuit 700 comprises a plurality of flip flops 750. In FIG. 7, four flip flops 750 are shown, namely a flip flop 710, a flip flop 720, a flip flop 730, and a flip flop 740. A clock 704 (e.g. that is provided for circuit 700) is distributed via a clock tree 706 that includes clock buffers 718, 728, 738, and 748. Clock buffers 718, 728, 738, and 748 control the rise and fall times of the edges of the clock that is inputted at clock terminal 712, 722, 732 and 742 respectively of flip flops 710, 720, 730 and 740.

An output terminal 716 of flip flop 710 is connected to an input terminal 724 of flip flop 720. An output terminal 726 of flip flop 720 is connected to an input terminal 734 of flip flop 730. An output terminal 736 of flip flop 730 is connected to an input terminal 744 of flip flop 740.

Figure 8:
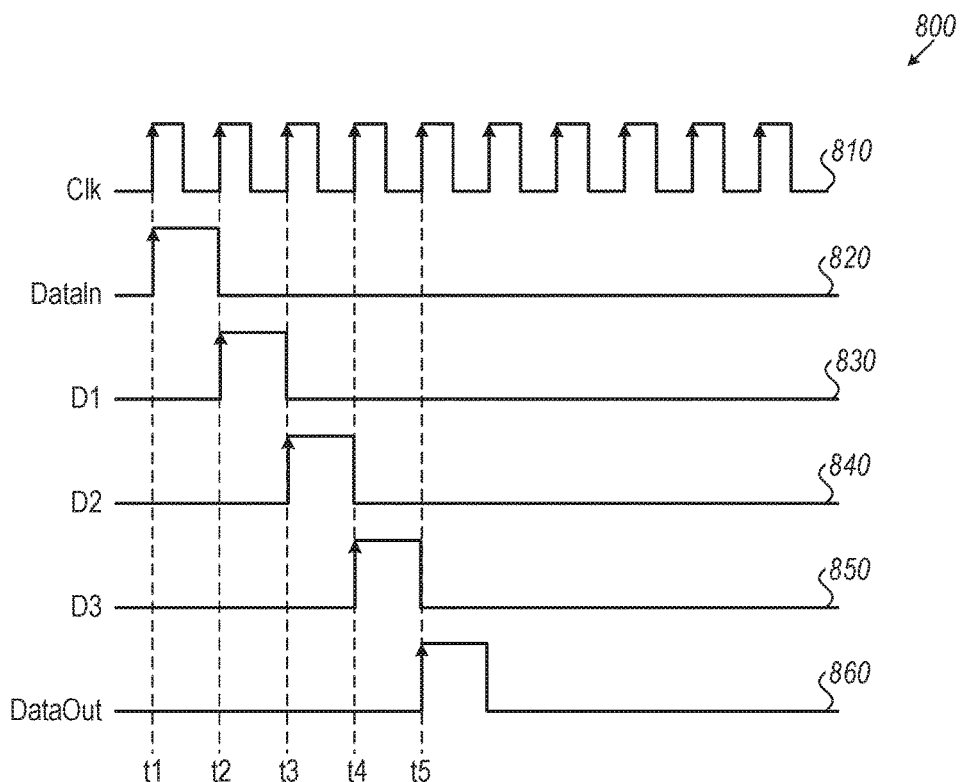
FIG. 8 is a timing diagram for the circuit of FIG. 7, in accordance with some embodiments of the presently disclosed subject matter.

FIG. 8 is a timing diagram 800 for circuit 700 of FIG. 7, in accordance with some embodiments of the presently disclosed subject matter.

Timing diagram 800 is typical of circuit 700 acting as a shift register with the timing behavior of a shift register, and no timing violations for flip flops 750. Clock signal 810 represents clock 704. It is assumed that clock tree 706 is designed so that there are no timing violations for flip flops 750, e.g. that there is no skew between the clock inputted at clock terminals 712, 722, 732 and 742. For simplicity's sake, it is assumed that the output of any of flip flops 750 transitions at a rising edge of clock signal 810. A high logic level for DataIn signal 820 is provided to input terminal 714 of flip flop 710 at time t1. As per the operation of a shift register, at the next rising edge of clock signal 810 at time t2, a high logic level for signal D1 830 is outputted from output terminal 716 of flip flop 710 and provided to input terminal 724 of flip flop 720. At the next rising edge of clock signal 810 at time t3, a high logic level for signal D2 840 is outputted from output terminal 726 of flip flop 720 and provided to input terminal 734 of flip flop 730. At the next rising edge of clock signal 810 at time t4, a high logic level for signal D3 850 is outputted from output terminal 736 of flip flop 730 and provided to input terminal 744 of flip flop 740. At the next rising edge of clock signal 810 at time t5, a high logic level for signal DataOut 860 is outputted at output terminal 746 of flip flop 740.

Figure 9:
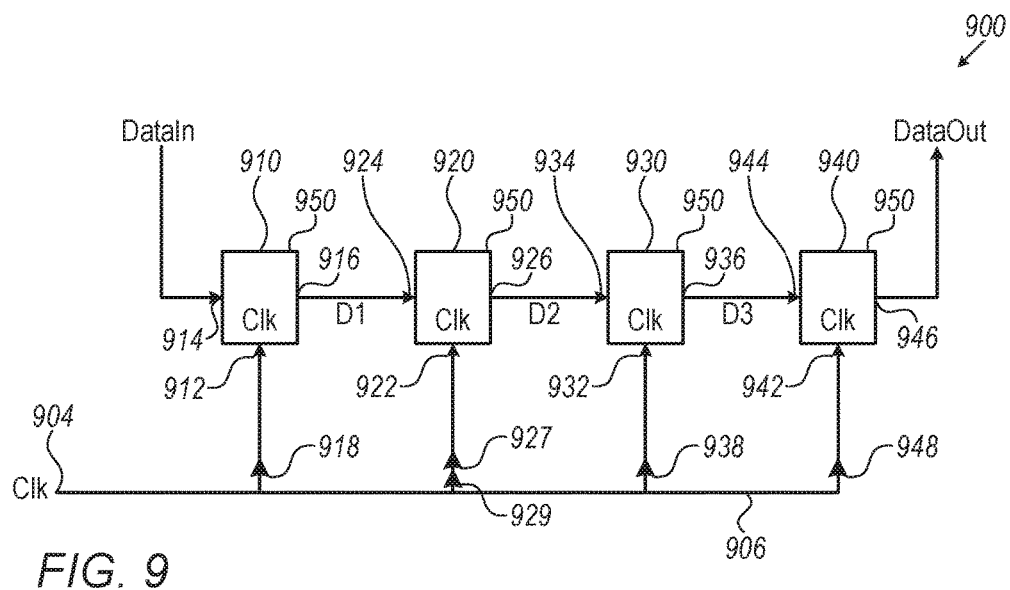
FIG. 9 is a diagram of another circuit, in accordance with some embodiments of the presently disclosed subject matter.

FIG. 9 is a diagram of another circuit 900, in accordance with some embodiments of the presently disclosed subject matter.

Circuit 900 is characterized by a timing behavior that includes a timing violation. The timing violation is due to the design of a clock tree 906. Due to the timing violation, circuit 900 does not function as a shift register, but is designed to perform a different function. Circuit 900 comprises a plurality of flip flops 950. In FIG. 9, four flip flops 950 are shown, namely a flip flop 910, a flip flop 920, a flip flop 930, and a flip flop 940. A clock 904 (e.g. that is provided for circuit 900) is distributed via a clock tree 906 that includes clock buffers 918, 927 and 929, 938, and 948. Clock buffers 918, 927/929, 938 and 948 control the rise and fall times of the edges of the clock that is inputted at clock terminal 912, 922, 932 and 942 respectively for flip flops 910, 920, 930 and 940. For example, the design of clock tree 906, and particularly the usage of two clock buffers 927 and 929 rather than one clock buffer, may cause there to be clock skew between the clock inputted at clock terminal 922 and the clock inputted at the other clock terminals 912, 932, and 942.

An output terminal 916 of flip flop 910 is connected to an input terminal 924 of flip flop 920. An output terminal 926 of flip flop 920 is connected to an input terminal 934 of flip flop 930. An output terminal 936 of flip flop 930 is connected to an input terminal 944 of flip flop 940.

Figure 10:
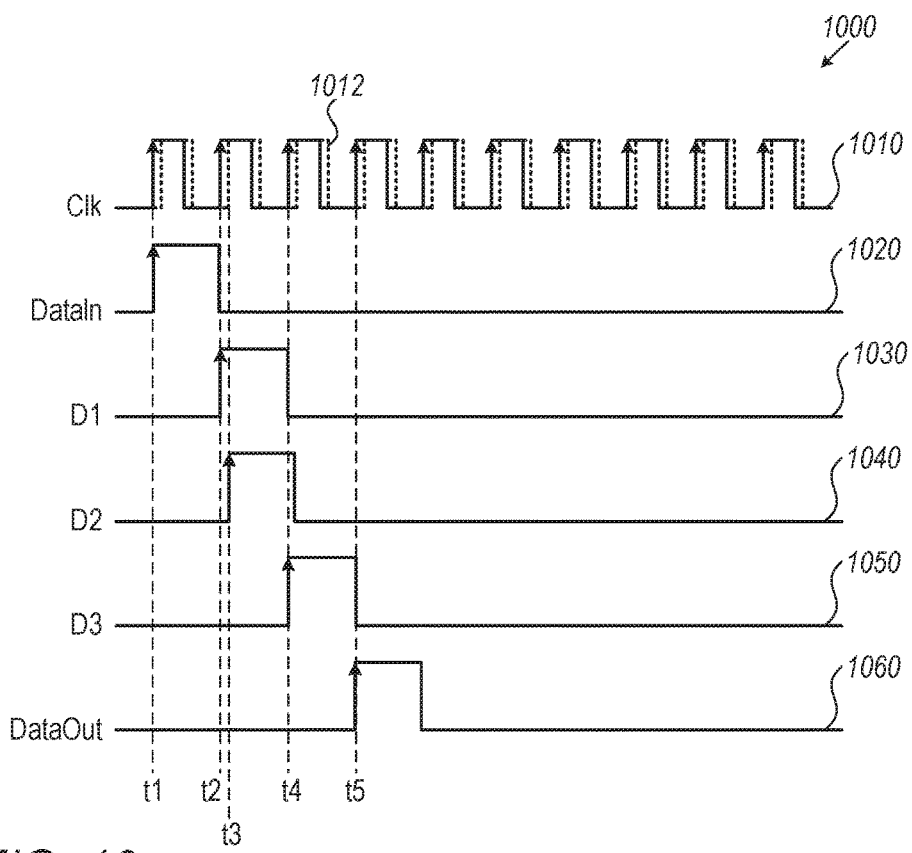
FIG. 10 is a timing diagram for the circuit of FIG. 9, in accordance with some embodiments of the presently disclosed subject matter.

FIG. 10 is a timing diagram 1000 for circuit 1000 of FIG. 10, in accordance with some embodiments of the presently disclosed subject matter.

Clock signal 1010 represents clock 904. It is assumed that due to the design of clock tree 906, clock signal 1010 is representative of the clock entering clock terminals 912, 932 and 942, but not representative of the clock entering clock terminal 922. Therefore the output of flip flop 920 transitions at a different time than the rising edge of clock signal 1010. For example, dotted clock signal 1012 may be representative of the clock inputted at clock terminal 922. A high logic level for DataIn signal 1020 is provided to input terminal 914 of flip flop 910 at time t1, the first rising edge of clock signal 1010 shown in FIG. 10. At the second rising edge of clock signal 1010 at time t2, a high logic level for signal D1 1030 is outputted at output terminal 916 of flip flop 910 and provided to input terminal 924 of flip flop 920. At the second rising edge of clock signal 1012 at time t3, a high logic level for signal D2 1040 is outputted from output terminal 926 of flip flop 920 and provided to input terminal 934 of flip flop 930. It is noted that the second rising edge of signal 1012 is before the third rising edge of clock signal 1010, and therefore there is a violation of the timing for flip flop 920 causing the high logic level for signal D2 1040 to be outputted earlier than would have been the case had the output of flip flop 1020 transitioned at the third rising edge of clock signal 1010. Flip flop 920 is considered to be substantially transparent because flip flop 920 reproduces a logic level at output terminal 926 prior to when the reproduction would have occurred had there been no timing violation. At the third rising edge of clock signal 1010 at time t4, a high logic level for signal D3 1050 is outputted from output terminal 936 of flip flop 930 and provided to input terminal 944 of flip flop 940. At the fourth rising edge of clock signal 1010 at time t5, a high logic level for signal DataOut 1060 is outputted at output terminal 946 of flip flop 940.

It is noted that if clock signals 810 and 1010 are equivalent then time t4 in FIG. 8 is equivalent to time t5 in FIG. 10, and DataOut 1060 is outputted earlier than DataOut 860 is outputted. It is further noted that due to the timing violation in circuit 900, the function of circuit 900 may not be readily apparent from a schematic and/or netlist prepared for circuit 900 during reverse engineering. The number of clock buffers, if any, in a clock tree may vary depending on the embodiment. In some embodiments, the clock tree of FIG. 9 may additionally or alternatively be designed to cause timing violation(s) due to too many clock buffers in the clock tree, two few clock buffers in the clock tree, clock buffers in the wrong position(s) in the clock tree, too long path length(s) in the clock tree, too short path length(s) in the clock tree, etc. Such timing violation(s) may cause circuit 900 to have a different function than a shift register, optionally rendering one or more of flip flops 910, 920, 930 or 940 transparent.

Additionally or alternatively, for any non-clock signal (e.g. DataIn 1020, D1 1030, D2 1040, or D3 1050) that is to be provided to a flip flop (e.g. flip flop 910, 920, 930, or 940, respectively), the number of buffer(s), if any, included in the path of a non-clock signal, and/or the path length for the path of the non-clock signal, may affect when the non-clock signal is provided to a flip flop, and therefore may cause a timing violation. Such timing violation(s) may cause circuit 900 to have a different function than a shift register, optionally rendering one or more of flip flops 910, 920, 930 or 940 transparent. The path of a non-clock signal may include for example, a connection between two flip flops in circuit 900, buffer(s), connection(s) between flip flop(s) and the buffer(s), connection(s) between the buffers, etc.

It is noted that both circuits 700 (FIG. 7) and circuit 900 are functional, the functions of both circuit 900 and 900 are predictable when manufactured, and neither circuit 700 or 900 is designed to cause a chip that includes the circuit to fail.

In some embodiments, a chip may include at least one circuit without any timing violations (e.g. circuit 700) and/or at least one circuit with timing violation(s) (e.g. circuit 900). For example, the chip may be an ASIC. In some embodiments where a chip includes at least one circuit without any timing violations and at least one circuit with timing violation(s), reverse engineering of the chip may be rendered more complicated due to the plurality of circuits with dissimilar functions that may not be readily apparent from schematics and/or netlists prepared for the circuits during the reverse engineering. For example, a chip may include circuit 700 functioning as a shift register, and circuit 900 where flip flop 920 is substantially transparent.

In some embodiments circuits 700 and 900 may include fewer or more flip flops than illustrated in FIGS. 7 and 9. Although the components illustrated in FIGS. 7 and 9 are flip flops, in some embodiments, a circuit with timing violation(s) may additionally or alternatively include other components. Due to the timing violation(s), the function of such a circuit in such embodiments is different than if the circuit did not have timing violation(s), and therefore the function may not be readily apparent from a schematic and/or netlist prepared for the circuit during reverse engineering. The function of such a circuit with timing violation(s) and/or the function that would have been the case if the circuit did not having timing violation(s) may vary depending on the embodiment.

In some embodiments of the disclosure (e.g. of the first aspect and/or the second aspect), a chip may be designed, including using a synthesizer to generate one or more netlist(s) (the old "netlist(s)") for the chip from code. The netlist(s) may exclude representations relating to dissimilar functions to be performed by the chip. Depending on the embodiment, no representations relating to the dissimilar functions may be included in the netlist(s), or some representations relating to the dissimilar functions may be included and some may be excluded. The netlist(s) may then be edited (e.g. by a netlist editor), thereby generating one or more new netlist(s) which is a modification of the old netlist(s). For example, for each function instance that does not have a representation in the netlist(s), a representation of a circuit (e.g. 100, 300, 700, or 900) that is adapted to perform the function may be integrated into the netlist(s). The circuits (whose representations are integrated into the netlist(s)) may, for instance, include one or more circuits having substantially the same geometries of layouts but differing timing behaviors and thus different functions (e.g. circuit(s) 100 and/or 300), and/or may include one or more circuits with timing violation(s)/without timing violation(s) and thus different functions (e.g. circuit(s) 700 and/or 900). The integration of each representation into the netlist(s) may therefore result in a respective circuit (e.g. 100, 300, 700 or 900) being integrated into each section of the chip that was left out (i.e. which did not correspond to any representation included in the old netlist(s)). In some cases the integrated representations may correspond to secure/cryptographic sections of the chip.

Additionally or alternatively, in some embodiments of the disclosure (e.g. of the first aspect and/or the second aspect), a chip may be designed, including using a synthesizer to generates one or more netlist(s) (the "old" netlist(s)) for the chip from code. The netlist(s) may then be edited (e.g. by a netlist editor), thereby generating one or more new netlist(s) which is a modification of the old netlist(s). The editing may include replacing existing representations in the netlist(s) that relate to dissimilar functions. For example, existing representations may be randomly selected for replacement from all of the existing representations in the netlist(s) that relate to the dissimilar functions and thus the selected existing representations may represent a subset of all of the existing representations relating to the dissimilar functions in the netlist(s). Representations for circuits adapted to perform the functions may be integrated into the netlist(s) in place of existing representations, thereby replacing the existing representations. For instance, the circuits (whose representations are integrated into the netlist(s)) may include one or more circuits having substantially the same geometries of layouts but differing timing behaviors and thus different functions (e.g. circuit(s) 100 and/or 300), and/or one or more circuits with timing violation(s)/without timing violation(s) and thus different functions (e.g. circuit(s) 700 and/or 900). In some cases, the integrated representations may correspond to secure/cryptographic sections of the chip.

Additionally or alternatively, in some embodiments of the disclosure (e.g. of the first aspect and/or the second aspect), when a chip is designed the netlist(s) of the chip that is generated (e.g. by the synthesizer from code) may include representations of circuits having substantially the same geometries of layouts but differing timing behaviors and thus different functions (e.g. circuit(s) 100 and/or 300), and/or representations of circuits with timing violation(s)/without timing violation(s) and thus different functions (e.g. circuit(s) 700 and/or 900).

Examples of components that may be used in a circuit in accordance with the disclosure (e.g. in accordance with the first aspect of the subject matter and/or second aspect of the subject matter) include: buffers, clock buffers, other logic gates (e.g. AND, OR, NAND, NOR, XOR, XNOR, NOT), flip flops, latches, other memory (for long term, short term, volatile, non-volatile, erasable, non-erasable, removable, non-removable, writeable, and/or re-writeable, etc.), processors, state machines, comparators, adders, multiplexers, multipliers, resistors, inductors, capacitors, operational amplifiers, diodes, transistors, and/or other switching components, etc. Examples of connections that may be used to connect between components in a circuit in accordance with the first aspect and/or second aspect of the subject matter include: wires, conductive traces, vias, etc. Paths for non-clock signals in accordance with the second aspect of the subject matter may include, for example, buffers, wires, conductive traces, vias, etc. A clock tree in accordance with the second aspect of the subject matter may include for example, clock buffers, wires, conductive traces, vias, etc.

In the above description of example embodiments, numerous specific details were set forth in order to provide a thorough understanding of the subject matter. However, it will be understood by those skilled in the art that some examples of the subject matter may be practiced without these specific details. In other instances, well-known features have not been described in detail so as not to obscure the subject matter.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will further be appreciated by persons skilled in the art that the present disclosure is not limited by what has been particularly shown and described hereinabove. Rather the scope of the disclosure is defined by the appended claims and equivalents thereof.

What is claimed is:

1. An apparatus comprising:
 a first plurality of components forming a first circuit adapted to perform a first function that is dependent on a first timing behavior of the first circuit, wherein the first timing behavior of the first circuit includes a timing violation during operation, and wherein a first geometry of the first plurality of components is substantially the same as a second geometry of a second plurality of components of a second circuit adapted to perform a second function that is dependent on a second timing behavior, and wherein the second timing behavior does not include the timing violation during operation.

2. The apparatus of claim 1, wherein the first plurality of components includes one or more components that are substantially the same as at least one component that would be in at least one corresponding position in the second circuit.

3. The apparatus of claim 1, wherein the first plurality of components includes at least one component that has a geometry that is substantially the same but has a different timing behavior than one or more components that would be in one or more corresponding positions in the second circuit.

4. The apparatus of claim 1, wherein the first plurality of components includes at least one component selected from a pool of components with substantially the same geometries but varied timing behaviors, the at least one component characterized by timing behavior suitable for implementing the first timing behavior of the first circuit.

5. The apparatus of claim 4, wherein the pool of components includes buffer cells.

6. The apparatus of claim 1, wherein the timing violation in the first timing behavior is caused by a clock tree.

7. The apparatus of claim 6, wherein the clock tree causes the timing violation in the first timing behavior by a number of clock buffers in the clock tree, a position of the clock buffers in the clock tree, or a path length in the clock tree.

8. The apparatus of claim 1, wherein the timing violation in the first timing behavior is caused by at least one non-clock signal.

9. The apparatus of claim 8, wherein the non-clock signal causes the timing violation in the first timing behavior by a number of buffers in a path of the non-clock signal or a path length of the path of the non-clock signal.

10. The apparatus of claim 1, wherein the timing violation renders one or more of the first plurality of components transparent to the operation of the first circuit.

11. A system comprising:
a first circuit including a first plurality of components, the first circuit adapted to perform a first function that is dependent on a first timing behavior of the first circuit, wherein the first timing behavior includes a timing violation during operation of the first circuit; and
a second circuit including a second plurality of components, the second circuit adapted to perform a second function that is dependent on a second timing behavior of the second circuit, wherein the second timing behavior does not include a timing violation during the operation of the second circuit,
wherein a first geometry of a first layout of the first circuit is substantially the same as a second geometry of a second layout of the second circuit.

12. The system of claim 11, wherein the timing violation in the first timing behavior is caused by a clock tree.

13. The system of claim 12, wherein the clock tree causes the timing violation in the first timing behavior by a number of clock buffers in the clock tree, a position of the clock buffers in the clock tree, or a path length in the clock tree.

14. The system of claim 11, wherein the timing violation in the first timing behavior is caused by at least one non-clock signal.

15. The system of claim 14, wherein the non-clock signal causes the timing violation in the first timing behavior by a number of buffers in a path of the non-clock signal or a path length of the path of the non-clock signal.

16. The system of claim 11, wherein the timing violation renders one or more of the first plurality of components transparent to the operation of the first circuit.

17. The system of claim 11, wherein either the first function is a buffer function and the second function is an inverter function, or the first function is the inverter function and the second function is the buffer function.

18. A method comprising:
determining whether a circuit represented by a representation in at least one old netlist for a chip is adapted to perform a first function or a second function based on whether a first timing behavior of the circuit includes a timing violation;
responsive to a determination that the circuit is adapted to perform the first function, replacing the representation of the circuit in the at least one old netlist with a first representation of the circuit in at least one new netlist;
responsive to a determination that the circuit is adapted to perform the second function, replacing the representation of the circuit in the at least one old netlist with a second representation of the circuit in the at least one new netlist,
wherein a layout of the circuit is substantially the same whether the circuit is adapted to perform the first function or the second function.

19. The method of claim 18, wherein determining whether the first timing behavior includes the timing violation comprises determining a timing of a clock tree.

20. The method of claim 19, wherein determining the timing of the clock tree comprises determining at least one of a number of clock buffers in the clock tree, a position of the clock buffers in the clock tree, or a path length in the clock tree.

* * * * *